Patented Mar. 24, 1953　　　　　　　　　　　　　　　　　　　　2,632,712

UNITED STATES PATENT OFFICE 2,632,712

ASPHALT COMPOSITION

Norman E. Lemmon and Robert E. Karll, Hammond, Ind., assignors to Standard Oil Company, Chicago, Ill., a corporation of Indiana No Drawing. Application April 2, 1951,
Serial No. 218,901

9 Claims. (Cl. 106—269)

This invention relates to bituminous road-making compositions and pertains more specifically to such compositions that contain components whereby the bituminous material is more securely bonded to a filler, termed the aggregate, and the bonded mixture is made more resistant to weathering.

Many aggregates, especially when wet, are difficult to coat with bituminous materials. This is especially true of acidic stone, such as granite or other igneous rocks which are usually hydrophilic; even though the aggregate is dried before coating, the bond will tend to break down in the presence of water during wear.

A primary object of this invention is the provision of an improved bitumen coating composition that will exhibit improved adherence to aggregate of all types both at the time of coating and during wear. The invention has for other objects such other advantages or results as will hereinafter appear in the specification and claims.

According to the present invention, bituminous road-making compositions are produced by admixing with a bituminous, preferably a bitumen asphalt, a small amount, preferably 0.1% to 2.0%, of a polymerized unsaturated acid, such, for example, as dilinoleic acid or dilinolenic acid or of a material containing said polymerized unsaturated acids. These polymerized acids can contain one or a plurality of double bonds per molecule. They have molecular weights between about 400 and 2000 and preferably between about 500 and 1400.

The bitumen constituting the binder material in the bituminous road-making compositions of this application can include petroleum residues and asphalts, including straight run, cracked and natural, oxidized and unoxidized asphalts, and coal tar pitches. The asphalt in the road-making composition can also be employed in the form of cutback, an asphalt that is diluted with a solvent to provide greater fluidity.

The glycerol esters of various carboxylic acids that are termed fat acids and occur in fats and oils of natural origin are often heated to effect a bodying of the oil and this results in a polymerization of the oils. A primary source for the polymerized fat acids employed in the present invention are those residual acids obtained by methanolysis of semi-drying oils, such, for example, as castor oil or soy bean oil, polymerizing the so-obtained methyl esters, removing unpolymerized compounds, saponifying the residual esters and freeing polymerized acids therefrom. When a soy bean oil is employed, this results in a product consisting of polymers of linoleic acid, about 75% of which is the dilinoleic acid, and about 20% of the trilinoleic acid. The polymeric product has an acid number of about 190 to 200 and a molecular weight between about 500 and 900, or between 560 and 590 for the dibasic acid. (Calculated molecular weight of dilinoleic acid is 560; some higher polymers are present.) The average molecular weight of the trimeric fat acid is approximately 840. The acids are characterized by having a plurality of double bonds and can result from the polymerization of fatty oils in the form of the glycerides of the fat acids or other esters, for example, the methyl esters, as hereinabove shown.

Several treatments may be employed to effect a polymerization of the oils. They can be for example polymerized by thermal treatment. They can also be polymerized by using a suitable polymerizing catalyst, in which case the temperature will vary with the selection of the catalyst. A common procedure employed in the production of fat acids is described in Cowan et al. 2,450,940, patended October 12, 1948 in which a fatty oil is subjected to alcoholysis with monohydric alcohols whereby the glycerides of the fat acids are converted to the corresponding monohydric alcohol esters. These esters are polymerized. Other reaction products are distilled from the polymers and the polymeric acids are freed from the esters by hydrolysis. Other methods are described in the said patent and other methods will be pointed out in the specific examples for producing the said crude polymers or recovered polyunsaturated dimerized acids.

A commercial process for preparing dimerized fat acids comprises the steps of heating unsaturated fat acids and a small amount of water to 330° to 360° C. at 85 to 400 pounds per square inch gauge for 3 to 8 hours and vacuum distilling the product. The acid polymer produced in this manner consists of about 85% of the di polymer, and 12% higher polymers.

The bitumen constituting the binder material in the bituminous road-making composition of this invention can include petroleum residues and asphalt, including straight run, cracked and natural, oxidized and unoxidized asphalts, and coal tar pitches.

The asphalt employed in the specific examples hereinafter reported consists of a mildly oxidized West Texas residuum. This asphalt was cut back with approximately half its volume of a kerosene-type solvent. It conforms to the following specification set forth in ASTM Standards 1949, part 3, designation D598–46, Table I (page 912) for MC–2 cutback asphalt:

Flash temperature, °F_____ not less than 150° F.
Viscosity, furol at 140° F____ 100–200
Distillation:
　　Percent off at 437° F____ not more than 10
　　Percent off at 500° F____ 15–55
　　Percent off at 600° F____ 60–87
　　Residue at 680° F_____ not less than 67%

The following specific examples serve to illustrate rather than limit the invention and show the effect of the additive herein disclosed in asphalt when coating both sand (hydrophilic) and limestone (hydrophobic).

*Example I*

This example illustrates the effect that monomeric fat acids have in asphalt coating compositions. These compositions gave only fair coatings on wet sand or limestone and they stripped extensively from wet sand and some limestones.

To a petroleum asphalt that has been cut back to a desired viscosity and heated to provide fluidity there was added 2% by weight thereof of oleic acid and in a second instance 2% of linoleic acid. About 4 parts by weight of the asphalt composition was stirred for about one minute with about 100 parts by weight of wet sand. The extent of the coating aggregate was thereafter observed and an equal weight of water was then added to the aggregate. The water and coated aggregate were mixed and allowed to stand for ten minutes. The mixture was then observed for evidence of stripping of the asphalt from the wet aggregate. It was observed that substantially the same results were obtained in both cases, the oleic and linoleic acid plus asphalt compositions provided only a fair coating on the wet sand and substantially no resistance to stripping, the stripping in both instances having been substantially complete.

Separate portions of the composition containing one percent of oleic acid were mixed with two wet limestones in the weight proportion of 4 parts of binder to 100 parts of aggregate. On one limestone this composition exhibited a coating rating of fair to good and an extensive stripping rate; on the other, a limestone less difficult to coat, a good coating was obtained, and only a small amount of stripping was observed.

The foregoing results show that in many cases monomeric fat acids are ineffective to provide compositions of satisfactory coating or stripping rates. It is especially true that these monomeric acids strip readily from acidic (hydrophilic) aggregates.

The remaining examples exhibit the improved character of asphalt compositions containing polymeric unsaturated acids.

*Example II*

Bituminous coating compositions were prepared by admixing one percent and 0.5 percent by weight of dilinoleic acid with asphalt of the type used in Example I. Each composition was then mixed with wet sand in the weight proportion of 4 parts of binder to 100 parts of aggregate by stirring the same together for one minute. The composition containing one percent of the dilinoleic acid exhibited a coating rating of good to very good. A volume of water equal to that of the aggregate was added and the mixture stood for 10 minutes. A slight stripping of binder from bonded aggregate was observed. The composition containing 0.5 percent by weight of dilinoleic acid exhibited a coating rating of good and a stripping rating of small.

Asphalt compositions containing one percent and 0.5 percent by weight of dilinoleic acid were mixed with a wet limestone. The composition containing one percent of acid exhibited a coating rating of excellent and a stripping rating of slight. The composition containing 0.5 percent by weight of acid exhibited a coating rating of good and a stripping rating of small.

*Example III*

A dimerized fraction of fat acids having a refractive index of 1.4753 to 1.4773 were obtained by fractionally distilling dimeric fat esters obtained from vegetable oils at temperatures between 150° to 200° C. at very low pressure, the distillate being saponified with alcoholic potassium hydroxide and neutralized with acid. This dimerized product exhibited a molecular weight of about 500 (calculated molecular weight of "dilinoleic acid" is 560); and an iodine number of 116. Coating compositions were prepared employing asphalt of the type described in Example I. In one instance the composition contained one percent by weight and in the other 0.5 percent by weight, based on the asphalt, of the said dimerized fat acids. Wet sand and the above compositions were mixed for about one minute in the proportion by weight of 100 parts of aggregate to 4 parts of the asphalt composition. An equal volume of water was added to the coated aggregate and the mixture was stirred for 10 minutes. The composition containing one percent of dimerized acids exhibited a coating rating of very good to excellent and only slight stripping. The composition containing 0.5 percent of the additive exhibited a coating rating of good and only small stripping.

Bituminous compositions containing one percent and 0.5 percent by weight of the said dimerized fat acids were admixed with a limestone aggregate in the manner above described and in the weight proportion of 4 parts of binder for 100 parts of aggregate. The composition containing one percent by weight of the acid exhibited a coating rating of excellent and a stripping rating of slight. The composition containing 0.5 percent by weight of the said acid exhibited a coating rating of good and a stripping rating of small.

*Example IV*

Trimeric fat esters were obtained from a mixture of dimeric and trimeric esters produced by the heat polymerization of the methyl esters of soy bean oil at 300° C. for 18 to 20 hours. The crude esters were molecularly distilled at 228° C. at extremely low pressure, the distillate fraction containing the trimeric esters was saponified with alcoholic potassium hydroxide and was neutralized with acid. The product exhibited a molecular weight of 750 and an iodine number of 114.

The so obtained trimeric acids were mixed with asphalt of the type described in Example I in the portions of one percent and 0.5 percent by weight. These compositions were added to wet sand in the proportion of 4 parts of composition per 100 parts by weight of aggregate and the coating and stripping characteristics of these coating compositions were tested and observed in the manner hereinbefore described. The composition containing one percent of additive exhibited a coating rating of very good to excellent and slight stripping. The composition containing 0.5 percent by weight of additive exhibited a coating rating of good and moderate stripping.

Bituminous coating compositions containing one percent and 0.5 percent by weight of the said trimerized fat acids were added to limestone aggregate in the manner above described and in the proportion of 4 parts of binder for 100 parts by weight of aggregate. The composition containing one percent of the said acid exhibited a coating rating of excellent and a stripping rating of slight. The composition containing 0.5 per cent by weight of the said acid exhibited a coating rating of good and a stripping rating of small.

*Example V*

In this example, a product containing higher fat-acid polymers was prepared and used as an asphalt additive. Methyl esters of soy bean fat acids were polymerized in the presence of two percent by weight, based on the esters, of hydrogen fluoride at a temperature of about 80° to 90° C. for one hour. The product was washed to remove hydrogen fluoride and the non-polymerized esters were removed by distillation under a vacuum of 0.4 millimeter Hg to a maximum distillation temperature of 250° C. A yield of 70 percent by weight of mixed polymeric esters having a refractive index of 1.4825 at 30° C. and a color of 14 Gardner was obtained. The esters were saponified with alcoholic potassium hydroxide and were neutralized to obtain free mixed polymeric fat acids. This mixture of higher fat-acid polymers was a highly viscous product having an observed molecular weight of 1400 and an iodine number of 137.

Bituminous compositions containing a cutback asphalt of the type described in Example I and one percent and 0.5 percent, by weight based on the asphalt, of the described mixed polymeric acids were added to wet sand in a weight ratio of 4 parts of binder to 100 parts of aggregate. The aggregate and binder were mixed in the described manner and the coating and stripping characteristics were observed. The composition containing one percent of mixed polymeric acid exhibited a coating rating of very good and a stripping rating of small. The composition containing 0.5 percent of the mixed fat acids exhibited a coating rating of good and a stripping rating of moderate.

Four parts by weight of the bituminous coating composition containing one percent by weight of the said polymeric fat acids were mixed with 100 parts by weight of a limestone aggregate in the described manner. After stirring the aggregate and binder for one minute the observed coating rating was excellent, and after soaking with an equal volume of water for ten minutes a stripping rating of slight was observed.

*Example VI*

Crude fat acids were obtained from soy bean foots oil. These crude fat acids were polymerized in the presence of boron fluoride in a ratio of 4 grams of boron fluoride per 100 grams of acids at a temperature of 200° C. for about 2 hours. The polymerized product, separated from the catalyst, exhibited a refractive index of 1.488 measured at 33° C. and an acid value of 166. The observed molecular weight of the polymer was 650 and the iodine number, 75.

An asphalt composition was prepared containing one percent by weight based on the asphalt of these polymerized acids. The composition was mixed with wet sand in a weight ratio of 4 parts of binder to 100 parts of sand by stirring the materials for about one minute. The coated aggregate was then examined and the said composition exhibited a coating rating of very good. An equal weight of water was added to the aggregate and the mixture was agitated at room temperature to determine the resistance of this composition to stripping. The stripping rating was small.

Four parts by weight of bituminous compositions containing one percent and one-half percent of the said polymerized acids were mixed with 100 parts by weight of a limestone aggregate in the described manner. The composition containing one percent of the polymer exhibited a coating rating of excellent and a stripping rating of slight; the composition containing one-half of one percent exhibited a coating rating of good and a stripping rating of small.

The molecular weights reported in the foregoing examples were determined by the Menzies method of measuring the effect of added sample on the boiling point of a benzene solution and were corrected to zero concentration by extrapolation to avoid errors introduced by association of the fat-acid molecules in the benzene.

Having now described our invention, we claim:

1. A composition of matter comprising a bitumen and between 0.1 and 2.0 percent by weight, based on the said bitumen of a polymerized, unsaturated fat acid having a molecular weight between 400 and 2000.

2. A composition of matter comprising a petroleum asphalt and from 0.1 to 2.0 percent by weight, based on the said asphalt, of a polymerized fat acid containing at least one double bond per molecule and moving a molecular weight between about 500 and 900.

3. The composition of claim 2 in which the polymerized, unsaturated acid is a dilinoleic acid.

4. A composition of matter comprising a petroleum asphalt and between 0.1 and 2.0 percent by weight, based on the said asphalt, of a material containing polymerized, polyunsaturated fat acids of which the predominant proportion is dilinoleic acid and a minor proportion is trilinoleic acid, the said acids having molecular weights respectively between about 560 and about 840.

5. A composition of matter having improved binding qualities, the said composition comprising a petroleum asphalt and from 0.1 to 2.0 percent by weight, based on the said asphalt, of a polymerized, unsaturated vegetable-oil fat acid which has a molecular weight between about 500 and 900.

6. The composition of claim 5 in which the said vegetable oil is soy bean oil.

7. The composition of claim 6 in which the polymerized, unsaturated acid is dilinoleic acid.

8. A process for coating a mineral aggregate comprising heating an asphalt to fluidity and coating the aggregate with the fluid asphalt in the presence of 0.1 to 2.0 percent by weight, based on the asphalt, of a polymerized, unsaturated vegetable-oil fat acid having a molecular weight between 400 and 2000.

9. The process of claim 8 in which the vegetable oil is soy-bean oil.

NORMAN E. LEMMON.
ROBERT E. KARLL.

REFERENCES CITED

The following references are of record in the file of this patent:

UNITED STATES PATENTS

| Number | Name | Date |
|---|---|---|
| 2,450,940 | Cowan | Oct. 12, 1948 |